(12) United States Patent
Pont

(10) Patent No.: US 10,371,201 B2
(45) Date of Patent: Aug. 6, 2019

(54) SPEED REDUCER AND METHOD OF ASSEMBLING SUCH A REDUCER

(71) Applicant: MOTEURS LEROY-SOMER, Angouleme (FR)

(72) Inventor: Pascal Pont, Champniers (FR)

(*) Notice: Subject to any disclaimer, the term of this patent is extended or adjusted under 35 U.S.C. 154(b) by 0 days.

(21) Appl. No.: 15/768,906

(22) PCT Filed: Oct. 18, 2016

(86) PCT No.: PCT/EP2016/074934
§ 371 (c)(1),
(2) Date: Apr. 17, 2018

(87) PCT Pub. No.: WO2017/067905
PCT Pub. Date: Apr. 27, 2017

(65) Prior Publication Data
US 2019/0078614 A1    Mar. 14, 2019

(30) Foreign Application Priority Data

Oct. 20, 2015 (FR) ..................... 15 59987

(51) Int. Cl.
*F16C 25/08* (2006.01)
*F16H 1/14* (2006.01)
(Continued)

(52) U.S. Cl.
CPC .......... *F16C 25/083* (2013.01); *F16C 19/386* (2013.01); *F16C 33/60* (2013.01);
(Continued)

(58) Field of Classification Search
CPC ............ F16C 19/18; F16C 19/181–184; F16C 19/385; F16C 25/083; F16C 35/063; F16C 35/067; F16C 2229/00; F16C 2361/61; F16H 1/14
See application file for complete search history.

(56) References Cited

U.S. PATENT DOCUMENTS

| 1,700,837 | A | * | 2/1929 | Fisher | ................... B23B 23/04 82/150 |
| 3,900,232 | A | | 8/1975 | Rode | |

(Continued)

FOREIGN PATENT DOCUMENTS

| DE | 102013208873 A1 | * | 12/2014 | ............ F16C 25/083 |
| DE | 102014200714 A1 | * | 7/2015 | ............ F16C 19/386 |

(Continued)

OTHER PUBLICATIONS

Corresponding International application, application No. PCT/EP2016/074934, International Search Report dated Jan. 9, 2017, 3 pages.

*Primary Examiner* — Phillip A Johnson
(74) *Attorney, Agent, or Firm* — Cooper Legal Group, LLC; Ronald M. Kachmarik

(57) ABSTRACT

A speed reducer including a shaft extending along an axis, two rolling bearings arranged around the shaft, the two rolling bearings each including a radially outer ring, a radially inner ring and rolling elements arranged between the outer and inner rings. The speed reducer includes a preload system positioned between the two rolling bearings and which includes: two spacer elements each one resting against one of the rings of the rolling bearings, at least one elastically deformable element interposed between the two spacing elements, and configured to occupy a preloaded first state and an least partially relaxed second state, the preload system arranged such that the transition of the at least one elastically deformable element from the first to the second state causes a unidirectional rotational movement of each spacer element with respect to the other so as to use a wedge effect to generate preload in the rolling bearings.

20 Claims, 2 Drawing Sheets

Figure 1:
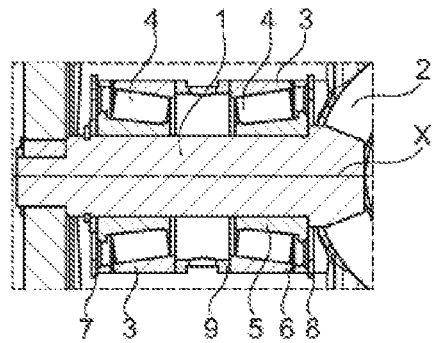

(51) Int. Cl.
*F16C 19/38* (2006.01)
*F16C 33/60* (2006.01)
*F16C 35/063* (2006.01)
*F16C 35/067* (2006.01)
*F16H 57/022* (2012.01)

(52) U.S. Cl.
CPC .......... *F16C 35/063* (2013.01); *F16C 35/067* (2013.01); *F16H 1/14* (2013.01); *F16C 2380/26* (2013.01); *F16H 2057/0221* (2013.01)

(56) References Cited

U.S. PATENT DOCUMENTS

| | | |
|---|---|---|
| 3,905,661 A | 9/1975 | Orr |
| 4,033,644 A | 7/1977 | Reneerkens |
| 4,231,622 A | 11/1980 | Paullin |
| 4,611,935 A * | 9/1986 | Rode .................. F16H 1/14 |
| | | 384/548 |
| 2008/0190229 A1 | 8/2008 | Dodak et al. |
| 2010/0247016 A1 | 9/2010 | Rivett et al. |

FOREIGN PATENT DOCUMENTS

| | | |
|---|---|---|
| EP | 0107470 A2 | 5/1984 |
| JP | S4514964 Y1 | 6/1970 |
| JP | S56134620 A | 10/1981 |
| JP | S6285302 U | 5/1987 |
| JP | H0266715 U | 5/1990 |
| JP | 2013253676 A | 12/2013 |
| KR | 20100078276 A | 7/2010 |

* cited by examiner

SPEED REDUCER AND METHOD OF ASSEMBLING SUCH A REDUCER

The present invention relates to speed reducers or multipliers. In particular, the present invention relates to the preloading of rolling bearings for a speed reducer or multiplier and also to the assembly of the speed reducer or multiplier.

The term "reducer" will be used hereinbelow equally to denote a speed reducer and a speed multiplier.

It is sometimes necessary to have preloaded rolling bearings in a reducer. The preload must then be homogenous and constant throughout the life of the machine.

Among the techniques for preloading rolling bearings, it is known practice when assembling a reducer to impose a degree of shimming in order to preload the rolling bearings. For example, FIG. 1 partially and schematically illustrates a reducer of the prior art provided with a shaft 1, with a spiral-conical gear 2, and with two rolling bearings 3 having conical rollers 4 arranged with a so-called "O" setup. The rolling bearings 3 comprise a radially inner ring 5 and a radially outer ring 6. Two circlips 7 and 8 make it possible to axially block the rolling bearings. In order to preload the rolling bearings 3, an interface formed by a shimming system 9 comprising shims is installed between the rolling bearings 3.

Figure 2:
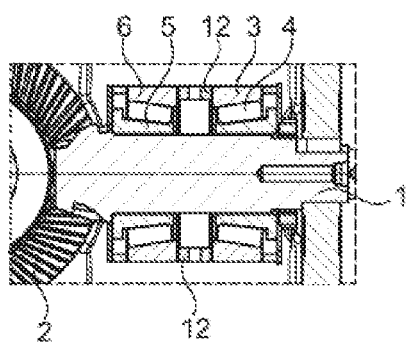

In the example of the prior art illustrated in FIG. 2, the implementation of a preload in the rolling bearings is achieved by arranging an interface formed by a slotted nut 12 between the rolling bearings 3 and by varying the tightening of said nut.

Thus, according to these two known embodiments, a prestress or preload is imposed by shimming in one of the rings of the rolling bearings during assembly.

These solutions create a number of problems.

First of all, a specific interface for each reduction gear pair is necessary. Within a complete range, it is thus necessary to have interface parts between the motors and the reducers. Thus, the number of references is relatively large for a complete range of motors and reducers. Furthermore, the production of the interface makes it necessary to measure the parts with zero play, to calculate the shimming to be performed and to statistically determine the values for obtaining a unique shimming. Thus, the assembly is based on statistics, without providing any certainty. Moreover, adjustment occurs machine by machine. Specifically, it is necessary to perform shimming case by case, for each machine produced, which generates a loss of time during assembly. Finally, during progressive use of the machine, the prestress provided at the start tends to diminish of the various parts.

An objective of the invention is thus to solve all or some of the problems posed by the prior art. In particular, the invention is aimed at reducing the assembly time, avoiding a loss of preload of the rolling bearings throughout the life of the machine and finding a solution which may be used for various machines.

The invention achieves this by virtue of a speed reducer comprising a shaft extending along a longitudinal axis, two rolling bearings arranged around the shaft, the two rolling bearings each comprising a radially outer ring, a radially inner ring and rolling elements arranged between the radially outer and inner rings, the reducer comprising a preload system positioned in the gap between the two rolling bearings, this preload system comprising:

two spacer elements respectively in bearing engagement with one of the rings of the rolling bearings, at least one elastically deformable element interposed between the two spacer elements which is configured to be able to occupy a first prestressed state and a second at least partially relaxed state, the preload system being designed such that the transition of said at least one elastically deformable element from the first state to the second state causes a unidirectional rotational movement of each spacer element with respect to the other and, by a wedge effect, generates a preload in the rolling bearings.

The term "bearing engagement" denotes equally a bearing contact and a bearing engagement with or without interposition of a ring-type element or other inserted element.

By virtue of the invention, there is provided an automatic prestress associated with an at least partial relaxation of said at least one elastically deformable element. The assembly time is thus reduced. When the mechanical pails start to wear, the action of the elastically deformable element or elements tends to maintain the preload defined upon assembly of the machines. The noise generated by the appearance of a play in the rolling bearing is thus reduced and the loss of preload is reduced, or even absent.

Each spacer element may be in bearing engagement only with the radially outer ring of the associated rolling bearing. In a variant, each spacer element may be only in bearing engagement against the radially inner ring of the associated rolling bearing.

Each spacer element advantageously has an outer face for hearing engagement against one of the rolling bearings and an inner face, opposed to the outer face, in contact with said at least one elastically deformable element, the inner face having at least one housing for said elastically deformable element such that it exerts, during the transition from the first state to the second state, a substantially tangential force on the inner face.

Advantageously, the inner face has at least one relief, being for example at least partially helical, with a substantially complementary shape to the inner face of the other spacer element apart from the housing of said at least one elastically deformable element.

The relief, such as the helical shape, of the inner face of each spacer element makes it possible to create an axial force by a wedge effect during the transition of said at least one elastically deformable element from the first state to the second state. Such a shape makes it possible to bring about an axial movement of the spacer elements away from one another during the transition from the first to the second state in order to generate an axial prestress in the rolling bearings.

The inner face of each spacer element may or may not be notched. The inner face of each spacer element may have a coefficient of friction between 0.05 and 0.6, preferably between 0.1 and 0.5, better still between 0.1 and 0.3. The coefficient of friction is preferably as high as possible. The key issue for the spacer is to have a helicoid angle sufficient to allow a sufficient axial deflection necessary for assembly and for taking up play and, paradoxically, sufficiently small to withstand the external axial forces without moving and minimizing the stiffness of the elastic elements.

In one particular embodiment, the two spacer elements are identical.

Said at least one elastically deformable element is, for example, a spring chosen from the group consisting of compression springs, tension springs and torsion springs, preferably a compression spring. When said at least one elastically deformable element is a compression spring, the transition from the first state to the second state consists in an at least partial relaxation of the spring, the first state being a compressed state.

The number of elastically deformable elements may be greater than one, preferably between two and eight, more preferably equal to four, the elements preferably being distributed in a uniform manner around the axis of rotation between the spacer elements.

The reducer advantageously comprises a transmission, it being possible for the transmission to comprise a gear, preferably a spiral-conical gear, the shaft advantageously bearing a conical pinion. The gear may be of any other type.

The rolling bearings may be ones with conical rollers or may be any other type of rolling bearings. The two rolling bearings may consist of rolling bearings having conical rollers with a so-called "X" setup or a so-called "O" setup, the radially inner and outer rings then having an axially increasing or decreasing thickness, respectively. When the rolling bearings have an O setup, each spacer element is in bearing engagement only with the radially outer ring of the associated rolling bearing. When the setup of the rolling bearings is an X setup, each spacer element is only in bearing engagement against the radially inner ring of the associated rolling bearing.

The reducer advantageously comprises at least one axial blocking element arranged against each rolling bearing so as to prevent any axial movement of said rolling bearing away from the other rolling bearing, it being possible for each axial blocking element to comprise at least one shoulder formed on the shaft, a notched nut and/or a circlip or be yet in some other form.

Another subject of the invention is a method for assembling a reducer as defined above, comprising the following steps:

installing the preload system according to the invention and the rolling bearings around the shaft so as to place said at least one elastically deformable element in the first stressed state, axially blocking the assembly of the rolling bearings and of the preload system, with the aid of axial blocking elements, so as to cause said at least one elastically deformable element to pass into the second at least partially relaxed state in order to generate a preload in the rolling bearings.

Figure 3:
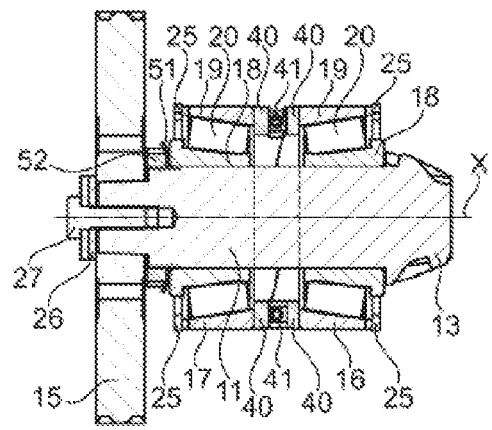
Figure 4:
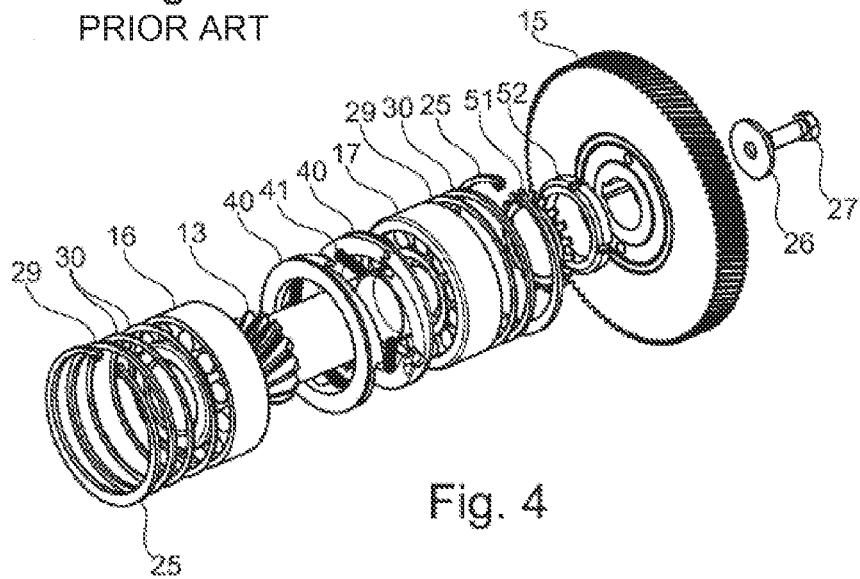
Figure 5:
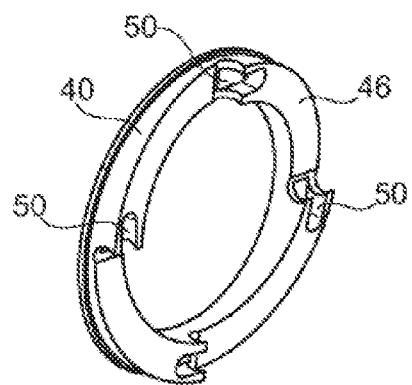
Figure 6:
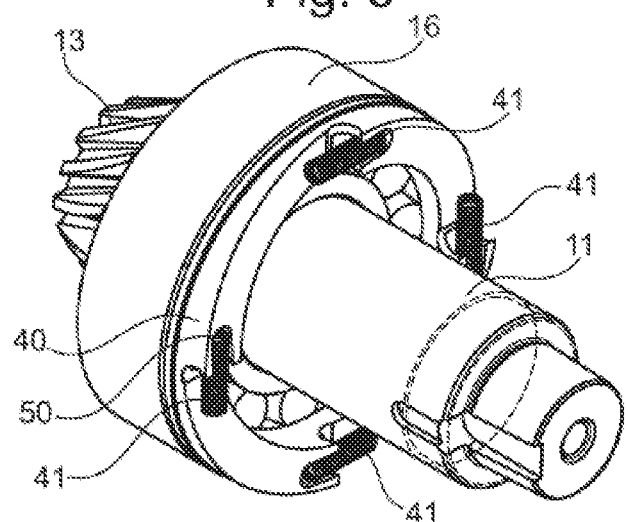
Figure 7:
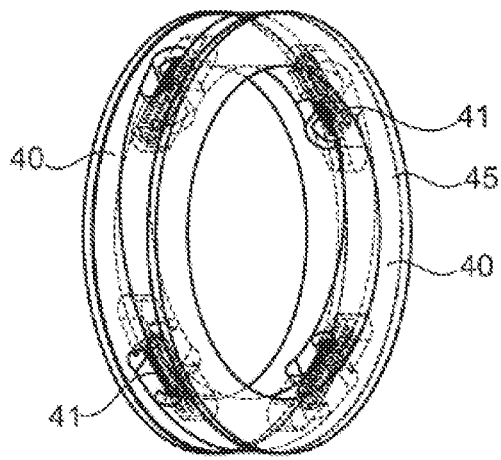

The invention may be better understood on reading the following detailed description of a nonlimiting exemplary embodiment of the invention in light of the appended drawing, in which:

FIGS. 1 and 2, described previously, are schematic and partial sections of the reducer according to the prior art, FIG. 3 is a schematic and partial sectional view of an example of a reducer according to the invention, FIG. 4 is a schematic exploded perspective view of the reducer of FIG. 3, FIG. 5 represents a spacer element in isolation, FIG. 6 partially represents the reducer of FIG. 3 during its assembly, and FIG. 7 represents the preload system in isolation.

FIG. 3 illustrates a speed reducer 10 according to the invention comprising a shaft 11 extending along a longitudinal axis X. In the example illustrated, the shaft bears a conical pinion 13 at one end and a cylindrical gearwheel 15 at another end, in a manner known per se. The reducer 10 further comprises rolling bearings 16 and 17 arranged around the shaft 11. Each rolling bearing 16 or 17 comprises a radially inner ring 18 and a radially outer ring 19 and also rollers 20 of conical type in the example illustrated. In the example of FIG. 3, the rolling bearings have an "X" setup, but that another setup would be possible without departing from the scope of the invention.

The reducer 10 comprises axial blocking elements 25 arranged against each rolling bearing 16 and 17 so as to block any axial movement of one rolling bearing away from the other rolling bearing.

In this example, the axial blocking element 25 comprises a circlip, but it could be otherwise without departing from the scope of the invention. In particular, the axial blocking element 25 could consist of a nut present on the shaft.

To retain the cylindrical gearwheel 15, a flat washer 26 and a screw 27 are provided, as visible in FIG. 3. To retain the radially inner ring of the rolling bearing 17, a slotted washer 51 and a slotted nut 52 are provided as visible in FIG. 3, but this device may readily be replaced by a shim and a circlip. In the example illustrated, bearing shims 29 and adjustment shims 30 are provided in the vicinity of the axial blocking elements 25, as visible in particular in FIG. 4.

In the space between the rolling bearings 16 and 17, the reducer 10 comprises two spacer elements 40, in this example identical, which are arranged substantially symmetrically with respect to one another, each spacer element 40 being in bearing engagement against one of the rings of the rolling bearing which is adjacent to it. Between the spacer elements 40 are inserted elastically deformable elements 41, which are four in number in the example illustrated. Each spacer element 40 is in bearing engagement, in this example in bearing contact, only with the outer ring 19.

As more visible in FIGS. 5 to 7, each spacer element 40 comprises an axially outer face or outer face 45 and, on the opposite side, an axially inner face or inner face 46 which faces the inner face 46 of the other spacer element 40. The outer face 45 bears on the nearer and substantially smooth rolling bearing 16 or 17 in the example illustrated. The inner face 46 of each spacer element 40 has at least one relief 49, in particular of helical shape with a housing 50 provided for each elastically deformable element 41, The elastically deformable elements 41 are able to occupy a first stressed state. In the case of an elastically deformable element 41 being constituted by a compression spring, as illustrated, the first state corresponds to a compressed state of the spring. The elastically deformable element 41 is able to also occupy a second at least partially relaxed state. During the transition from the first state to the second state, the elastically deformable element 41, on account of the shape of the inner face 46 of each spacer element, exerts a tangential force, which creates a unidirectional rotational movement of each spacer element 40 with respect to the other. This rotation generates, by a wedge effect, an axial movement of the spacer elements 40 away from one another and thus a preload in the rolling bearings 16 and 17 by exerting a stress on the ring with which each spacer element 40 comes into bearing engagement.

The invention is of course not limited to the example which has just been described.

In particular, one or more intermediate parts may be interposed between the two spacer elements 40 without departing from the scope of the invention.

Likewise, the preload may be generated by virtue of eccentrics provided between the two spacer elements 40, which eccentrics are provided with torsion springs in order to take up the play generated by wear.

The number and the type of elastically deformable elements 41 may be different without departing from the scope of the invention. For example, the elastically deformable element 41 may consist of a torsion spring or a tension spring.

The inner face 46 of each spacer element 40 may be notched. The two spacers elements 40 may or may not be identical.

The inner shape 46 of the spacer elements 40 may differ from a helical ramp.

The invention claimed is:

1. A speed reducer comprising a shaft extending along a longitudinal axis, two rolling bearings arranged around the shaft, the two rolling bearings each comprising a radially outer ring, a radially inner ring and rolling elements arranged between the radially outer and inner rings, characterized in that it comprises a preload system positioned in the gap between the two rolling bearings, the preload system comprising:

two spacer elements each in bearing engagement with one of the rings of the rolling bearings, at least one elastically deformable element interposed between the two spacer elements, said at least one elastically deformable element is configured to be able to occupy a first prestressed state and a second at least partially relaxed state, the preload system being designed such that the transition of said at least one elastically deformable element from the first state to the second state causes a unidirectional rotational movement of each spacer element with respect to the other so as to generate, by a wedge effect, a preload in the rolling bearings.

2. The reducer as claimed in claim 1, wherein each spacer element is in bearing engagement only with the radially outer ring of the associated rolling bearing.

3. The reducer as claimed in claim 1, wherein each spacer element is only in bearing engagement against the radially inner ring of the associated rolling bearing.

4. The reducer as claimed in claim 1, wherein each spacer element has an outer face for bearing engagement against one of the rolling bearings and an inner face, opposed to the outer face, in contact with said at least one elastically deformable element, the inner face having at least one housing for said elastically deformable element such that said elastically deformable element exerts, during the transition from the first state to the second state, a tangential force on the inner face.

5. The reducer as claimed in claim 4, wherein the inner face is at least partially helical, with a substantially complementary shape to that of the other spacer element apart from the housing of said at least one elastically deformable element.

6. The reducer as claimed in claim 4, wherein the inner face of each spacer element forming a smooth or notched surface.

7. The reducer as claimed in claim 1, wherein at least the inner face of each spacer element is produced from a material such as steel and has a coefficient of friction between 0.05 and 0.6.

8. The reducer as claimed in claim 1, wherein the two spacer elements are identical.

9. The reducer as claimed in claim 1, wherein said at least one elastically deformable element is a spring chosen from the group consisting of compression springs, tension springs and torsion springs.

10. The reducer as claimed in claim 9, wherein said at least one elastically deformable element is a compression spring.

11. The reducer as claimed in claim 1, wherein said at least on elastically deformable element comprises a number of elastically deformable elements number of elastically deformable elements is greater than one, said elastically deformable elements being distributed between the spacer elements.

12. The reducer as claimed in claim 11, wherein the number of elastically deformable elements is between two and eight.

13. The reducer as claimed in claim 11, wherein the number of elastically deformable elements is equal to four.

14. The reducer as claimed in claim 11, wherein the number elastically deformable elements are distributed in a uniform manner between the spacer elements.

15. The reducer as claimed in claim 1, comprising a transmission, the transmission comprising a gear.

16. The reducer as claimed in claim 15, wherein the gear is spiral-conical, the shaft bearing a conical pinion.

17. The reducer as claimed in claim 1, the two rolling bearings consisting of conical rolling bearings with a so-called X setup or a so-called O setup, the radially inner and outer rings having an axially increasing or decreasing thickness, respectively.

18. The reducer as claimed in claim 1, comprising at least one axial blocking element arranged against each rolling bearing so as to prevent any axial movement of said rolling bearing away from the other rolling bearing, each axial blocking element comprising at least one shoulder formed on the shaft, a notched nut and/or a circlip or another type of axial blocking element.

19. A method for assembling a reducer as claimed in claim 1, comprising the following steps;

mounting the preload system and the rolling bearings around the shaft so as to place said at least one elastically deformable element in the first stressed state, axially blocking the assembly of the rolling bearings and of the preload system, with the aid of axial blocking elements, so as to cause said at least one elastically deformable element to pass into the second at least partially relaxed state in order to generate a preload in the rolling bearings.

20. The reducer as claimed in claim 1, wherein at least the inner face of each spacer element has a coefficient of friction between 0.1 and 0.3.

* * * * *